United States Patent [19]

Pefley et al.

[11] Patent Number: 4,466,257

[45] Date of Patent: Aug. 21, 1984

[54] REFRIGERATED FILTER ASSEMBLY AND METHOD OF USING SAME

[75] Inventors: Richard K. Pefley; J. Barrett Pullman, both of Santa Clara, Calif.

[73] Assignee: Prodatek Corporation, Portola Valley, Calif.

[21] Appl. No.: 408,911

[22] Filed: Aug. 17, 1982

[51] Int. Cl.³ .............................................. F25D 3/02
[52] U.S. Cl. ...................................... 62/318; 55/195; 62/475; 210/DIG. 6
[58] Field of Search .................. 62/318, 85, 474, 475, 62/55, 317; 55/195; 210/DIG. 6

[56] References Cited

U.S. PATENT DOCUMENTS 3,084,523  4/1963  Bottum et al. ........................ 62/513
4,316,366  2/1982  Manning ............................... 62/513

Primary Examiner—Ronald C. Capossela
Attorney, Agent, or Firm—Limbach, Limbach & Sutton

[57] ABSTRACT

The present invention is a self-aided refrigerated filter assembly and method for its use for filtration of liquid petroleum gas (LPG) so that a liquid phase is maintained during the filtration process and that the LPG is sufficiently subcooled to suppress the formation bubbles to prevent the risk of vapor lock or cavitation damages to a pump downflow from the filtration process and/or to provide liquid for metering purpose.

9 Claims, 2 Drawing Figures

REFRIGERATED FILTER ASSEMBLY AND METHOD OF USING SAME

BACKGROUND OF THE INVENTION

In the art of processing saturated liquids, such as liquid petroleum gas (LPG), there are considerable problems with filtering it. The main problem is preventing portions of the LPG in liquid phase being filtered from changing its state from liquid phase to vapor phase. When this change of state takes place it results in vapor bubbles being formed which mix with the liquid phase. The change of state is due to the throttling effect of filtration on the LPG flow.

During the development of LPG throttle body fuel injection systems, this problem of filtering was experienced. It was found that in order to overcome this problem, a high capacity, low restriction fuel filter was needed. So, a filter was designed to hold large quantities of dirt and debris which normally contaminate LPG and the filter had a low flow impedance to minimize the formation of vapor bubbles in the filter. It was also found that if the filter was disposed near a means which would provide some level of refrigeration to the LPG flowing through the filter, there was a decrease in the tendency of the LPG, to change state (phase).

The problems resulting from the formation of vapor bubbles in the liquid phase of LPG are not only experienced in the filter, but in pumping and/or metering mechanisms down stream from the filter.

The vapor bubbles in saturated liquids being pumped create a high risk of cavitation damage to the pump due to the collapse of the vapor bubbles in the pump. It is only when vapor bubbles are prevented from forming that subsequent metering problems or vapor bubble collapse in the pumping mechanism and resulting cavitation damage are prevented.

The present invention overcomes these problems.

SUMMARY OF THE INVENTION

The present invention is an apparatus (assembly) and method of self-aided subcooling of a saturated liquid to prevent the formation of vapor bubbles in the saturated liquid prior to and during filtration and in subsequent delivery of the saturated liquid. In the preferred embodiment, the saturated liquid is LPG (propane). The assembly includes a fuel filter housing with filtering material contained therein, a heat sink which is attached to the fuel filter housing, and a fuel pump connected to the outflow of the heat sink. The heat sink includes a refrigeration mechanism that removes heat from the heat sink, fuel filter housing, and the saturated fluid contained in and flowing through the housing.

According to the invention, saturated liquid supplied from a tank enters the fuel filter housing substantially as a saturated liquid. However, on entering the housing, it is actually a mixture of saturated liquid and vapor. Thus, there is the existence of vaporous bubbles in the saturated liquid, as the initial amounts of the saturated liquid exit the fuel filter and enter the heat sink. A small stream of the saturated liquid from the flow passing through the heat sink is directed to a separate section of the heat sink for vaporization to accomplish the refrigeration aspects. A flow control solenoid positioned in the heat sink controls the flow of the small stream directed for vaporization. The solenoid, when activated, will allow the small stream to enter a throttling orifice which vents into an expansion chamber. In the expansion chamber, the saturated liquid phase will vaporize. Since heat is required to change the saturated liquid from liquid phase to vapor phase, heat is drawn from the materials enclosing the place where the vaporization takes place. So, heat is removed from the physical structure of the heat sink. The heat removal from the heat sink also causes heat to be removed from the attached fuel filter housing and the saturated liquid contained therein. This heat removal will subcool the saturated liquid within the filter. The heat removal is also sufficient to subcool LPG in vapor phase in the filter to condense it and change it to the liquid phase of the saturated liquid.

The fuel pump (not shown) which is adjacent to the heat sink draws on the subcooled outflow of saturated liquid from the heat sink. Since saturated liquid is subcooled when it leaves the heat sink, the tendency of it to vaporize under the reduced inlet pressure of the pump is minimized. Therefore, since vapor bubbles are not formed, subsequent vapor bubble collapse in the pump is prevented.

An object of the present invention is to provide an apparatus and method which uses a small vaporizing stream of a saturated liquid to subcool and maintain a larger saturated liquid flow in the liquid phase prior to and during filtration.

Another object of the invention is to provide an apparatus and method which uses a small vaporizing stream of a saturated liquid to subcool and maintain a larger saturated liquid flow in the liquid phase during its passage through a fuel pump and/or fuel metering devices.

A still further object of the invention is to provide an apparatus and method which uses a small vaporizing stream of a saturated liquid to subcool a larger flow of saturated liquid in a fuel filter assembly to condense any saturated vapor that may enter a fuel filter assembly along with a saturated liquid to liquid phase.

The novel features which are believed to be characteristic of the invention, both as to organization and method of operation, together with further advantages thereof, will be better understood from the following drawings, in which several preferred embodiments of the invention are illustrated by way of example.

DETAILED DESCRIPTION OF THE DRAWINGS

Figure 1:
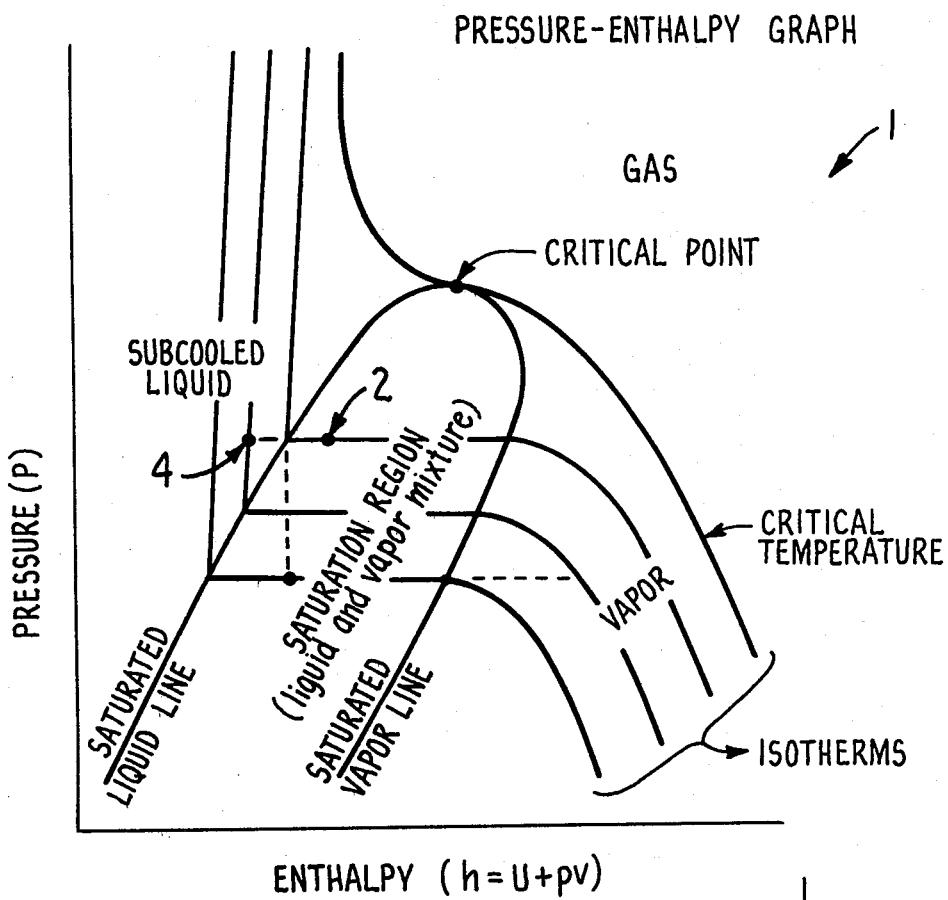
FIG. 1 is a pressure-enthalpy graph for saturated liquids.
Figure 2:
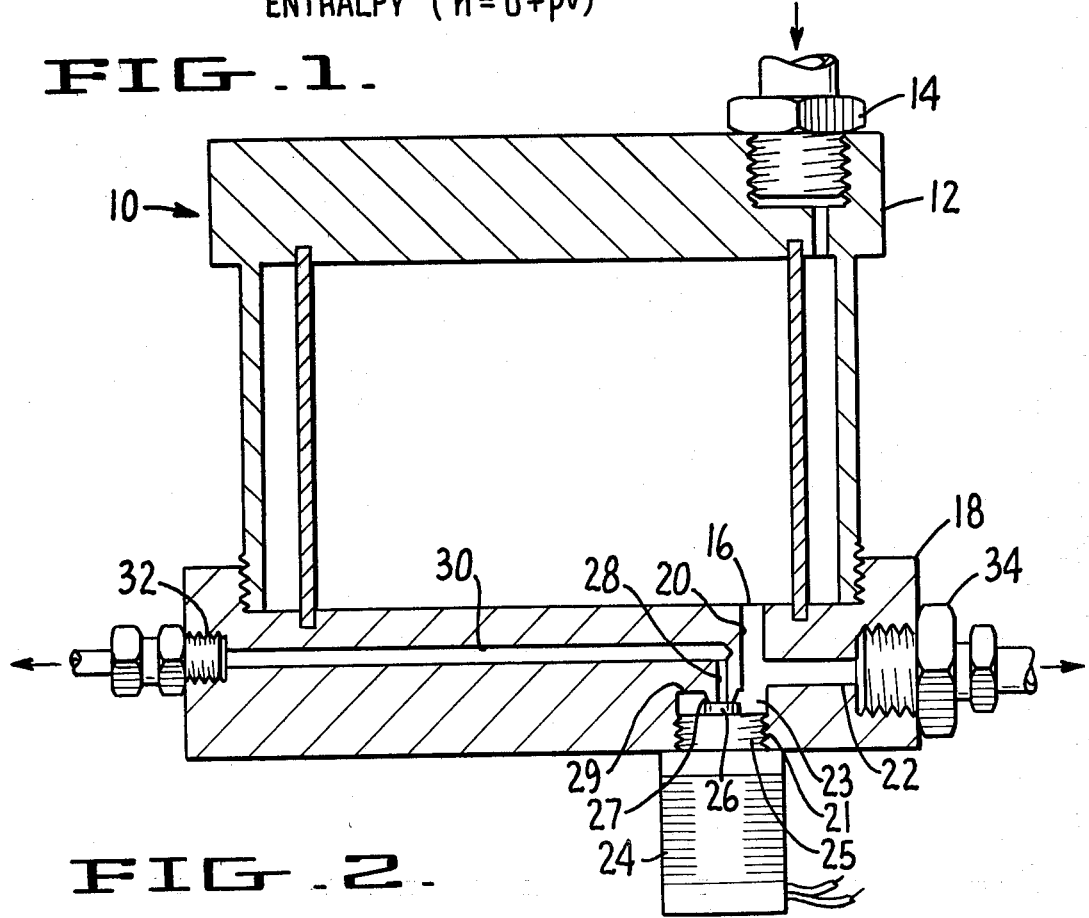
FIG. 2 is a cross-sectional side view of a representative apparatus of the invention.

Referring to FIGS. 1 and 2, the apparatus and method of the invention will be described. A saturated liquid, such as LPG, is normally subject to storage in a tank. When it is desired to use the LPG, it must be removed from the tank, filtered, and transferred for use. The disclosure hereinafter when it refers to LPG is describing saturated liquid that is used for the preferred embodiment of the invention. However, other saturated liquids or refrigerants can be substituted for LPG and not prevent practicing of the invention.

Referring to FIG. 1, a pressure-enthalpy graph is shown. The property of enthalpy is the thermodynamic potential of a system. In this case the system contains a saturated liquid. Enthalpy is expressed by the following formula:

$$H = U + pV,$$

where U is the internal energy of the system, p is the pressure and V the specific volume. The state (or phase) of the saturated liquid is dependent on the temperature of the saturated liquid at a given pressure.

Referring to FIG. 2, the assembly includes fuel filter housing 12, heat sink 18, flow control solenoid 24, and a pump (not shown). Their interaction will be hereafter described in detail so as to disclose the apparatus and method of the invention.

Fuel filter housing has LPG inlet 14 connected to the top surface. The filter housing has contained therein conventional filter elements of any standard type used for filtering liquids such as LPG. The fuel filter housing 12 is situated so that LPG, once filtered, can pass into heat sink 18.

The heat sink 18, to which the fuel filter housing 12 is integrally connected in the primary embodiment, is configured for the purposes of allowing the LPG to flow through it and for heat removal from the assembly. For this purpose, the LPG inlet passage 20 is aligned with outlet 16 of the fuel filter housing. Disposed from and in fluid communication with passage 20 within heat sink 18 is passage 22. Passage 22 is for outflow of the LPG from the heat sink. An opening (or bore) 21 having upper area 23 is disposed in the heat sink. The upper area 23 of bore 21 is in fluid communication with both passage 20 and 22. The bore 21 is adapted to receive end 25 of flow control solenoid 24. When the solenoid is disposed in bore 21, it will not completely fill upper area 23 so as to prevent its fluid communication with passage 20 and 22.

Top wall 29 of upper area 23 has extending therefrom frustoconical projection 27. The projection has bore 28 extending therethrough which is a throttling orifice. When end 25 of solenoid 24 is disposed in opening 21, plunger 26, which extends upward from end 25, contacts the end of projection 27 and closes off a first end of throttling orifice 28 from fluid communication with upper area 23.

An expansion passage 30 is disposed from and in fluid communication with a second end of the throttling orifice 28. The expansion passage 30 is of a greater diameter than the throttling orifice 28. The expansion passage extends through the heat sink and is connected to vapor bleed fixture 32 for venting vapors from the expansion passage.

In the primary embodiment of the apparatus, it has been described that there is the use of one flow control solenoid, one throttling orifice, and one expansion passage. The inventor contemplates that there can also be the use of a plurality of these elements. Additionally, the expansion chamber can be of any shape within the heat sink, i.e. zig-zag, spiral, serpentine, straight line etc. and portions of the heat sink can project up into the filter housing for better heat removal from the saturated liquid being filtered.

The method of operation of the apparatus will now be described. In operation, LPG, in substantially the liquid phase, enters filter housing 12 through filter inlet 14. Generally, the LPG from a storage tank (not shown) is in the saturation region at 2 (FIG. 1). As such, the LPG being input into the filter is a mixture of liquid phase and vapor phase LPG. The vapor phase of the LPG, usually exists as vapor bubbles in the liquid phase.

Even though the filter is designed to provide low flow impedance, there is still some throttling effect within the filter which causes additional vapor bubbles to be created as the initial amounts of LPG in liquid phase are filtered and flow through the housing. Once filtration has taken place, the filtered LPG in liquid phase (with included amounts of LPG in vapor phase) will flow from filter outlet 16 into inlet passage 20 of heat sink 18. The LPG in liquid phase will fill passages 20, 22, and open area 23, which are all in fluid communication. The LPG which flows from passage 20 to passage 22 will flow to outlet fixture 34 to a pump (not shown). The LPG in liquid phase which fills open area 23 will be used for self-aided subcooling purposes.

The heat sink 18 removes heat from it, the filter housing 12 and the LPG contained in the filter housing 12 as stated. To accomplish heat removal, the operation of the heat sink will be disclosed in the subsequent paragraphs.

In the preferred embodiment, the heat sink 18 is constructed of a highly thermal conductive material. There are sufficient contact points between the heat sink 18 and filter housing 12 for conduction of heat from the housing and LPG contained therein to the heat sink 18. It is also contemplated that portions of the heat sink can extend up into the filter housing to effect better heat transfer from the LPG contained in the filter housing to the heat sink, as stated.

To effect heat removal, solenoid 24 is activated which recesses plunger 26 into head 25, so that throttling orifice 28 is no longer closed off from fluid communication with upper area 23. A small stream of LPG in liquid phase will pass from open area 23 into throttling orifice 28. The LPG in liquid phase will travel up through orifice 28 and upon reaching the end of the orifice will vaporize upon entry into expansion passage 30. The vaporization takes place because expansion passage 30 is of a greater diameter than orifice 28 and the liquid phase LPG experiences a lessening of pressure which will cause it to vaporize. The vaporization of the LPG in the expansion passage requires heat. Therefore heat is absorbed from the heat sink to carry forth the change of state. The absorption of heat by the change of state (phase) removes heat from the heat sink 18, the filter housing 12, and the LPG in liquid and vapor phase within the housing.

The success of the self-aided cooling depends on the pressure drop experienced by the LPG in liquid phase as it passes out of the throttling orifice 28 and into expansion chamber 30. To ensure that there continues to be a pressure differential to cause vaporization, the end of the expansion chamber is connected to a vapor bleed fixture 32. The fixture 32 allows vapor in the expansion passage to bleed from the heat sink to keep the pressure in chamber 30 at the proper level for continued vaporization of the LPG after throttling in the throttling orifice 28.

While solenoid 24 remains activated the stream of LPG from open area 23 will continue to be vaporized in expansion chamber 30. The continued vaporization causes heat to be transferred from the heat sink material to support the change of state of the LPG. The attached filter housing 12 and LPG in the housing, transfer their heat to the heat sink. This continued action of heat removal from the mixture of LPG in the liquid and vapor phases which enters the housing 12 causes subcooling of the LPG mixture. From the state of the LPG at 2 (FIG. 1) when it entered, the LPG is subcooled to the state represented at 4 on the pressure-enthalpy graph in the subcooled region where vapor bubbles are suppressed. The LPG in vapor phase (vapor bubbles) that entered the filter housing are condensed to LPG in liquid phase. Even though filtering causes some degree of throttling, the subcooled LPG will maintain its liquid phase throughout the filtering process.

The subcooled LPG in liquid phase when passing through passages 20 and 22 of heat sink 28 will have additional heat removed because of the direct contact with heat sink 18. The LPG is subcooled to a temperature at which it will maintain its liquid phase when the pump connected to outlet fixture 34 draws on the LPG. Even though the subcooled LPG experiences a moderate pressure drop within the pump, it is still not prone to vaporize under the reduced pressure. Therefore, the non-existence of vapor bubbles in the LPG prevents cavitation within the pump. It can also allow the use of liquid metering elements.

By use of the apparatus and method of the invention disclosed herein, a subcooling LPG flow rate of 0.04 lbs./minute provides a maximum heat sink of approximately 7 BTU/minute to the housing and LPG contained therein.

The inventor contemplates the invention to be all that is shown, described, and claimed to the invention. However, there can be various alterations, adaptations and changes to the invention which are in the contemplation of the inventor. Thus, the invention is all that is shown, described, and claimed to be the invention and all equivalents thereto.

We claim:

1. A self-aided refrigerated filter assembly for maintaining a fluid in fluid phase during filtration comprising a filter means for filtering a flow of a fluid in liquid phase; a heat sink means with means connected to and in fluid communication with said filter means; and a control means with means connected to said heat sink means for controlling a portion of the fluid in liquid phase through said heat sink means, the heat sink means further comprising a first passage and second passage in fluid communication with each other for receiving the fluid in liquid phase outflowing from said filter means and channeling it for passage out of the heat sink means, a void in fluid communication with said first and second passage for receiving at least a portion of the fluid in liquid phase outflowing from said filter means, a third passage in fluid communication with said void, and a fourth passage in fluid communication with said third passage having an outlet means for venting the contents in said fourth passage.

2. The assembly as recited in claim 1 wherein the first and second passages are disposed perpendicular to each other.

3. The assembly as recited in claim 2 wherein an end of the second passage has means attached thereto for outflowing fluid in liquid phase from the heat sink means.

4. The assembly as recited in claim 3 wherein a pump means is connected to the means for outflowing fluid in liquid phase from the heat sink means.

5. The assembly as recited in claim 1 wherein the third passage is a throttling orifice.

6. The assembly as recited in claim 1 wherein the control means controls the flow of fluid in liquid phase between the void and the third passage.

7. The assembly as recited in claim 6 wherein the control means includes a flow control solenoid.

8. The assembly as recited in claim 1 wherein the fourth passage is an expansion chamber.

9. The assembly as recited in claim 1 wherein the diameter of the fourth passage is greater than the diameter of the third passage.

* * * * *